UNITED STATES PATENT OFFICE.

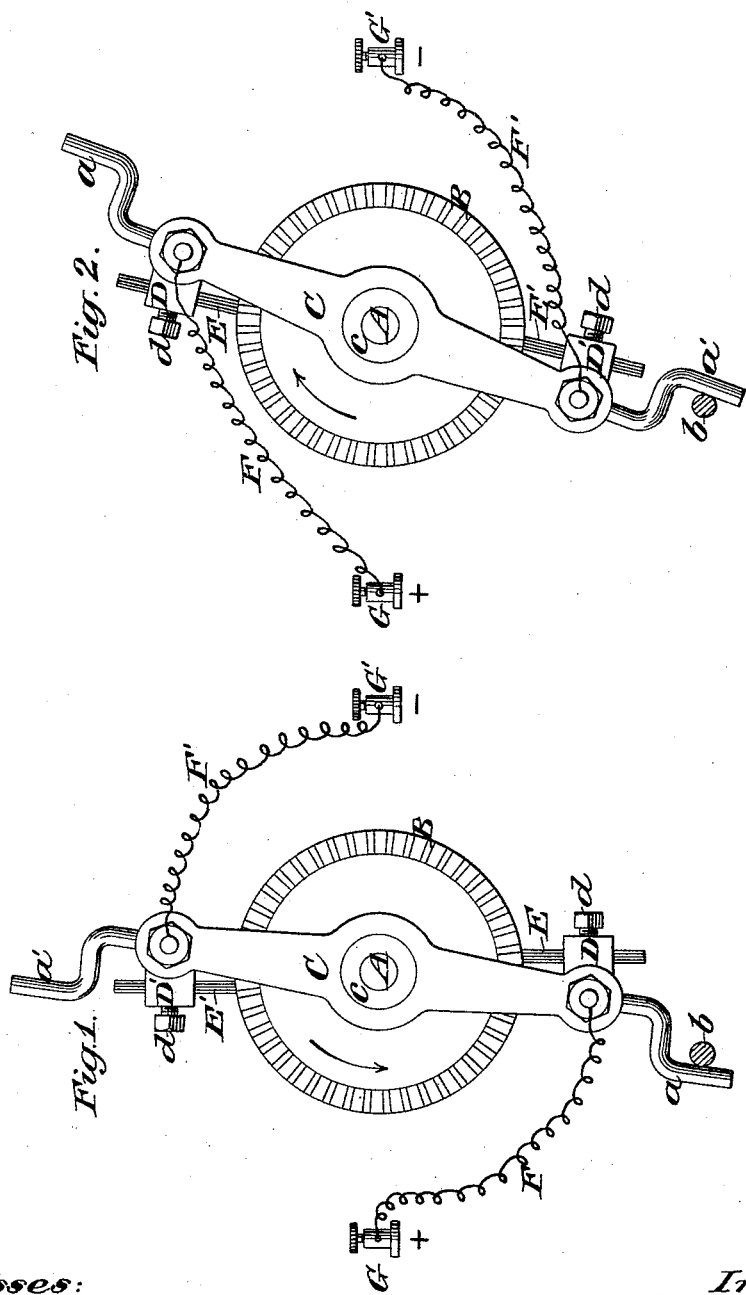

WILLIAM L. BLISS, OF BROOKLYN, NEW YORK.

SELF-ADJUSTING BRUSH FOR DYNAMO-ELECTRIC MACHINES.

SPECIFICATION forming part of Letters Patent No. 525,836, dated September 11, 1894.

Application filed April 13, 1894. Serial No. 507,371. (No model.)

*To all whom it may concern:*

Be it known that I, WILLIAM L. BLISS, of Brooklyn, in the county of Kings and State of New York, have invented a new and useful Improvement in Dynamos, of which the following is a specification.

The object of this invention is to provide automatically for the constant polarity of a dynamo in whichever direction it may rotate and notwithstanding changes or reversal of the direction of the rotation.

The invention may be applied to all dynamos the direction of the rotation of which is required to be or liable to be reversed but the polarity of which is required to be constant; but it is especially applicable to dynamos deriving motion from the running gear of railway vehicles for the purpose of charging storage batteries for the illumination of such vehicles.

It is a well understood and accepted fact that by changing the positions one for the other of the brushes of a dynamo the polarity of the brushes is reversed, and also that reversing the direction of the rotation of the armature while the brushes remain fixed reverses the polarity of the brushes; hence if when the reversal of the rotation of the armature is made the brushes are shifted so that each is made to occupy a position the reverse of that which it previously occupied they will continue to have the same polarity as before or, in other words, their polarity remains constant.

The object of this invention is to provide in a very simple way for the automatic shifting of the brushes by the act of reversing the rotation of the armature and for the arrest of the so shifted brushes in such positions that their polarity will be made to correspond with the reversal of the rotation of the commutator, or in other words, will remain constant.

The invention is illustrated in the accompanying drawings in which Figures 1 and 2 represent a side view of the commutator, the brush-carrier and brushes, the flexible leads and the terminals of a two-pole dynamo, one view showing the brush-carrier and brushes in one position and the other showing them in the reverse position.

A designates the rotary armature shaft and B the commutator; C, the brush-carrier to the opposite arms of which the brush-holders D D' with the brushes E E' are fitted and secured in the usual or any suitable manner.

The brush-carrier C is fitted to turn quite freely as far as required in either direction upon a fixed hub or pivotal support $c$ which surrounds the shaft A.

F F' are the flexible leads which connect the brush holders respectively with the two terminals G G' of which we will suppose G to represent the positive and G' the negative pole. The ends of the brush holder are furnished with projecting fingers or projections $a\ a'$ to come in contact with a fixed stop $b$ for limiting the distance of the rotation of the brush-carrier in either direction to what is sufficient to reverse the positions of the two brushes on the commutator.

The brushes are so adjusted in the holders and secured by their binding screws $d$ that the friction of the brushes on the commutator will be greater than that of the brush holder on its supporting hub $c$, so that whenever the direction of rotation of the armature shaft and commutator is changed, the first mentioned friction will cause the brush-carrier and brushes to turn upon the said hub in the new direction until one of its projections $a\ a'$ strikes the stop $b$ and arrests the further rotation.

The operation may be understood by a comparison of Figs. 1 and 2 of the drawings in one of which figures the commutator is supposed to be rotating in one direction and in the other of, which it is supposed to be rotating in the opposite direction as indicated by arrows, the brush holder being in one case held by the friction of the commutator on the brushes against one side of the stop $b$, and against the opposite side of the stop in the other case, the relative positions of the brushes during the rotation of the commutator in either direction being the reverse of their relative positions during the rotation in the other direction so that the reversal of the current which would otherwise have been caused by the change of direction of rotation of the dynamo and the reversal which would otherwise have resulted by the change of position of the brushes neutralize each other and preserve the polarity of the current. It may be observed that the distance through which the brush-carrier is permitted to rotate in the case of the two-pole machine illustrated is somewhat more than one hundred and eighty degrees in order to provide for a proper angular lead for the brushes in either direction; but it is obvious that in a four-pole machine the distance through which the brushes would be required to rotate would be only sufficiently more than ninety degrees or in a six-pole machine only sufficiently more than to provide sixty degrees for the necessary angular lead.

What I claim as my invention is—

In a dynamo, the combination with the commutator, the brushes and the brush-carrier, of a pivotal support upon which the brush-carrier is fitted to rotate freely in either direction, and a fixed stop against which the brush-carrier rotated by the friction of the commutator on the brushes is positively arrested in either direction to stop the brushes in positions the reverse of that which they occupy when their carrier is arrested in the opposite direction, substantially as and for the purpose herein set forth.

WILLIAM L. BLISS.

Witnesses:
JOHN L. BLISS,
CHARLES L. DUNN.